United States Patent
Woo et al.

(10) Patent No.: US 11,727,665 B2
(45) Date of Patent: Aug. 15, 2023

(54) UNMANNED AIRCRAFT SYSTEM (UAS) DETECTION AND ASSESSMENT VIA TEMPORAL INTENSITY ALIASING

(71) Applicant: National Technology & Engineering Solutions of Sandia, LLC, Albuquerque, NM (US)

(72) Inventors: Bryana Lynn Woo, Belen, NM (US); Gabriel Carlisle Birch, Albuquerque, NM (US); Jaclynn Javonna Stubbs, Albuquerque, NM (US); Camron G. Kouhestani, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 146 days.

(21) Appl. No.: 17/200,488

(22) Filed: Mar. 12, 2021

(65) Prior Publication Data

US 2022/0020110 A1    Jan. 20, 2022

Related U.S. Application Data

(62) Division of application No. 16/141,385, filed on Sep. 25, 2018, now Pat. No. 10,977,772.

(51) Int. Cl.
*G06T 3/40* (2006.01)
*G06T 3/00* (2006.01)
*G06V 10/42* (2022.01)
*G06V 10/764* (2022.01)
*G06V 10/82* (2022.01)

(52) U.S. Cl.
CPC .............. *G06V 10/431* (2022.01); *G06T 3/00* (2013.01); *G06T 3/40* (2013.01); *G06V 10/764* (2022.01); *G06V 10/82* (2022.01)

(58) Field of Classification Search
CPC ................................ G06T 3/4084; G06T 3/00
(Continued)

(56) References Cited

U.S. PATENT DOCUMENTS

| 4,777,605 A | 10/1988 | Pilkington |
| 5,239,595 A | 8/1993 | Takemura et al. |

(Continued)

OTHER PUBLICATIONS

K. P. Valavanis, Advances in Unmanned Aerial Vehicles: State of the Art and the Road to Autonomy. Springer Science & Business Media, 2007, vol. 33.

(Continued)

*Primary Examiner* — Jeffery A Williams
(74) *Attorney, Agent, or Firm* — Daniel J. Jenkins (57) ABSTRACT

A method and system for temporal frequency analysis for identification of unmanned aircraft systems. The method includes obtaining a sequence of video image frames and providing a pixel from an output frame of the video; generating a fluctuating pixel value vector; examining the fluctuating pixel value vector over a period of time; obtaining the frequency information present in the pixel fluctuations; summing the frequency coefficients for the vectorized pixel values from the fluctuating pixel value vector; obtaining an image representing a two dimensional space based on the summed center frequency coefficients; generating a series of still frames equal to a summation of the center frequency coefficients for pixel variations; and combining the temporal information into spatial locations in a matrix to provide a single image containing the spatial and temporal information present in the sequence of video image frame.

14 Claims, 5 Drawing Sheets

(58) Field of Classification Search
USPC .......................................................... 348/144
See application file for complete search history.

(56) References Cited

U.S. PATENT DOCUMENTS

| | | | |
|---|---|---|---|
| 8,421,019 | B2 | 4/2013 | Riley et al. |
| 8,958,602 | B1 | 2/2015 | Lane et al. |
| 10,733,755 | B2 | 8/2020 | Liao et al. |
| 2008/0285856 | A1* | 11/2008 | Zahavi ................ G06V 10/421 |
| | | | 382/195 |
| 2019/0225139 | A1 | 8/2019 | Godwin, IV et al. |

OTHER PUBLICATIONS

A. Bossuyt, F. Deconinck, R. Lepoudre, and M. Jonckheer, "The Temporal Fourier Transform Applied To Functional Isotopic Imaging", Information Processing In Medical Imaging Paris, Jul. 2-6, 1979, 1980.

D. Helm, H. Labischinski, G. Schallehn, and D. Naumann, "Classification and Identification of Bacteria by Fourier-Transform Infrared Spectroscopy," Microbiology, vol. 137, No. 1, pp. 69-79, 1991.

M. E. Cain, H. D. Ambos, F. X. Witkowski, and B. E. Sobel, "Fast-Fourier Transform Analysis of Signal-Averaged Electrocardiograms for Identification of Patients Prone to Sustained Ventricular Tachycardia." Circulation, vol. 69, No. 4, pp. 711-720, 1984.

C. Joenathan, B. Franze, P. Haible, and H. J. Tiziani, "Novel Temporal Fourier Transform Speckle Pattern Shearing Interferometer," Optical Engineering, vol. 37, No. 6, pp. 1790-1795, 1998.

T. Jannson, "Real-time Fourier Transformation in Dispersive Optical Fibers," Optics Letters, vol. 8, No. 4, pp. 232-234, 1983.

R. J. Povinelli and X. Feng, "Temporal Pattern Identification of Time Series Data Using Pattern Wavelets and Genetic Algorithms," in Artificial Neural Networks in Engineering, vol. 2, 1998, pp. 691-696.

J. Gertler, "US Unmanned Aerial Systems." Library of Congress Washington DC Congressional Research Service, 2012.

* cited by examiner

UNMANNED AIRCRAFT SYSTEM (UAS) DETECTION AND ASSESSMENT VIA TEMPORAL INTENSITY ALIASING

CROSS-REFERENCE TO RELATED APPLICATIONS

This application is a divisional of U.S. patent application Ser. No. 16/141,385, entitled "UNMANNED AIRCRAFT SYSTEM (UAS) DETECTION AND ASSESSMENT VIA TEMPORAL INTENSITY ALIASING," filed on Sep. 25, 2018, the disclosure of which is incorporated herein by reference in its entirety.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application relates generally to the field of unmanned aircraft systems (UAS). The application relates more specifically to a system and method for detection and assessment of UAS.

UAS include any type of flying vehicle or aircraft that functions without a pilot on-board the aircraft. These vehicles function with on-board flight controllers or remote-control systems. UAS pose a security concern due to the lack of human risk involved in piloting unmanned systems. Currently, UAS are commonly remote-controlled by the pilot, and the methods of detection and assessment for these devices reflects that commonality. Detection and assessment of these devices is often implemented by searching for a unique radio frequency communication between a UAS device and the controller or UAS camera and recorder. Assessments may also be made using frequency signature libraries and cross-referencing known communication protocols with these libraries. However, the technology surrounding these systems is growing rapidly and UAS may be capable of autonomous navigation in the future, thus rendering existing detection and assessment methods ineffective.

UAS detection and assessment may be challenging, especially when passive imaging devices are utilized. Birds often appear similar to UAS at large distances, and move in a similar manner that could confuse simple algorithmic processing methods.

However, multi-blade UAS such as quad-copters have fast moving rotors which may be exploited for detection and even assessment. Current UAS detection methods may result in false detections by failing to distinguish actual UAS from airborne objects such as birds or other background images. Birds and other background objects and scenery generally do not include high frequency data that may be characteristic of UAS, e.g., fast moving rotors. Spatial data alone is useful for detection but has distance limitations.

What is needed is a system and method to positively identify UAS compared to a bird or a background image with no target present. The temporal signal observed from a region of pixels containing a UAS contains different frequency data than, e.g., a bird or background image. Temporal frequency information can be extracted from a region of interest and processed to detect and assess a UAS at greater distances than may be achievable with spatial data alone.

An assessment method is disclosed that allows the creation of a UAS-specific signature to enable lower nuisance alarm rates and autonomous UAS detection.

The disclosure satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a method for temporal frequency analysis for identification of unmanned aircraft systems includes obtaining a sequence of video image frames and providing a pixel from an output frame of the video; generating a fluctuating pixel value vector; examining the fluctuating pixel value vector over a period of time; obtaining the frequency information present in the pixel fluctuations; summing the center frequency coefficients for the vectorized pixel values from the fluctuating pixel value vector; obtaining an image representing a two dimensional space based on the summed center frequency coefficients; generating a series of still frames equal to a summation of the center frequency coefficients for pixel variations; and combining the temporal information into spatial locations in a matrix to provide a single image containing the spatial and temporal information present in the sequence of video image frame.

Another embodiment relates to a method for temporal frequency analysis for identification of an unmanned aircraft system (UAS) including generating a sequence of images; evaluating a temporal frequency content of the images; processing the digital signal by applying a Fourier transform algorithm; isolating at least a portion of a data set representing UAS flights partitioning images containing a target; partitioning the same image without the target obtaining an average background image for noise management; subtracting the average background image from the background and target containing frames to obtain the changes for each frame.

In another embodiment, a system for temporal frequency analysis for identification of an unmanned aircraft system (UAS) is disclosed. The system includes a data collection unit, a graphical processing unit and an output device in data communication. The data collection unit includes a video camera configured to acquire a sequence of video data associated with an area of interest. The graphical processing unit includes a temporal frequency analysis module, a machine learning module, and a classification module in data communication. The graphical processing unit is arranged to collect data transmitted to the graphical processing unit (GPU) via the data collection unit. The GPU processes the video data in a temporal sequence of frames via the graphical processing unit, performs analysis of temporal frequency of the respective sequence of frames via the temporal frequency analysis module, and applies at least one machine learning algorithm to the analyzed frames via the machine learning module. The GPU classifies the temporal frequency analysis via the classification module and transmits the processed video data to the output device.

The disclosure provides a method for analysis of temporal UAS system data using cameras for UAS detection and assessment. Averaging and subtraction of background signal from image data possibly containing an object of interest showed differences in pixel averages when UAS targets were present in the image. Through the transformation of the object containing data to the frequency spectrum, a readily visible difference between the background image, a UAS, and a bird can be observed. This distinct difference showed the possibility of a temporal intensity pattern that defines the presence of a drone, e.g., a DJI Phantom 4 model, in the frequency spectrum. Using a simulated model, the frequency spectrum may be used for UAS detection and assessment via passive imaging systems.

Another advantage of the disclosed temporal frequency analysis methodology lies in the ease of examination for a human. Distant objects are not only unclassifiable by the machine, but they are nearly invisible to a human. However, the temporal frequency analyzed data clearly shows objects moving in the output frame and provides a trail of the motion. The method provides more pixels that can be viewed, thus allowing the objects to be viewed and classified at greater distances. Thus, the temporal frequency analysis method provides improved classification via support vector machine algorithms, increased training data, and alternative coefficients.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

An assessment method is disclosed that allows the creation of a UAS-specific signature to enable lower nuisance alarm rates and autonomous UAS detection. This UAS-specific signature may be obtained through the analysis of the frequency content of a visible camera pixel. Frequency content of an image may be obtained by monitoring the change over a period of time for each individual pixel within the visible camera. Applying a frequency transformation to the obtained temporal pixel fluctuations provides frequency coefficients for the changing pixel. The temporal frequency transformation may then be collapsed into a single two-dimensional matrix that contains both spatial and temporal data. The collapse representation may then be utilized by machine learning algorithms to enable more accurate detection and assessment of UAS. In the event of a necessary human classification of a target, e.g., where the output of the algorithm is an uncertain classification, the human classification may be returned to the machine learning algorithm in order to improve the algorithm and autonomous classification. The temporal frequency analyzed data may be classified using a machine learning algorithm and compared to the raw data that is similarly classified. The temporal frequency analysis method is shown to have significant improvements over the raw data analysis.

The Fourier transform may provide rich frequency information when used to analyze datasets. These rich datasets have been used in identification of a variety of targets in a variety of fields, e.g., palm print identifications, identification of patients with ventricular tachycardia, and bacteria identification. However, when searching for unique data signatures or structures, it is often useful to also examine the temporal features of the data. This concept has been applied in various forms over the years including time series analysis using wavelet transforms, gated cardiac blood pool studies, speckle shearing interferometry, and dispersive optical fibers. In this document we present a novel method of a temporal Fourier transform entitled temporal frequency analysis. The temporal frequency analysis is directed to the generation of spatial and temporal signatures for UAS detection and assessment.

Figure 1:
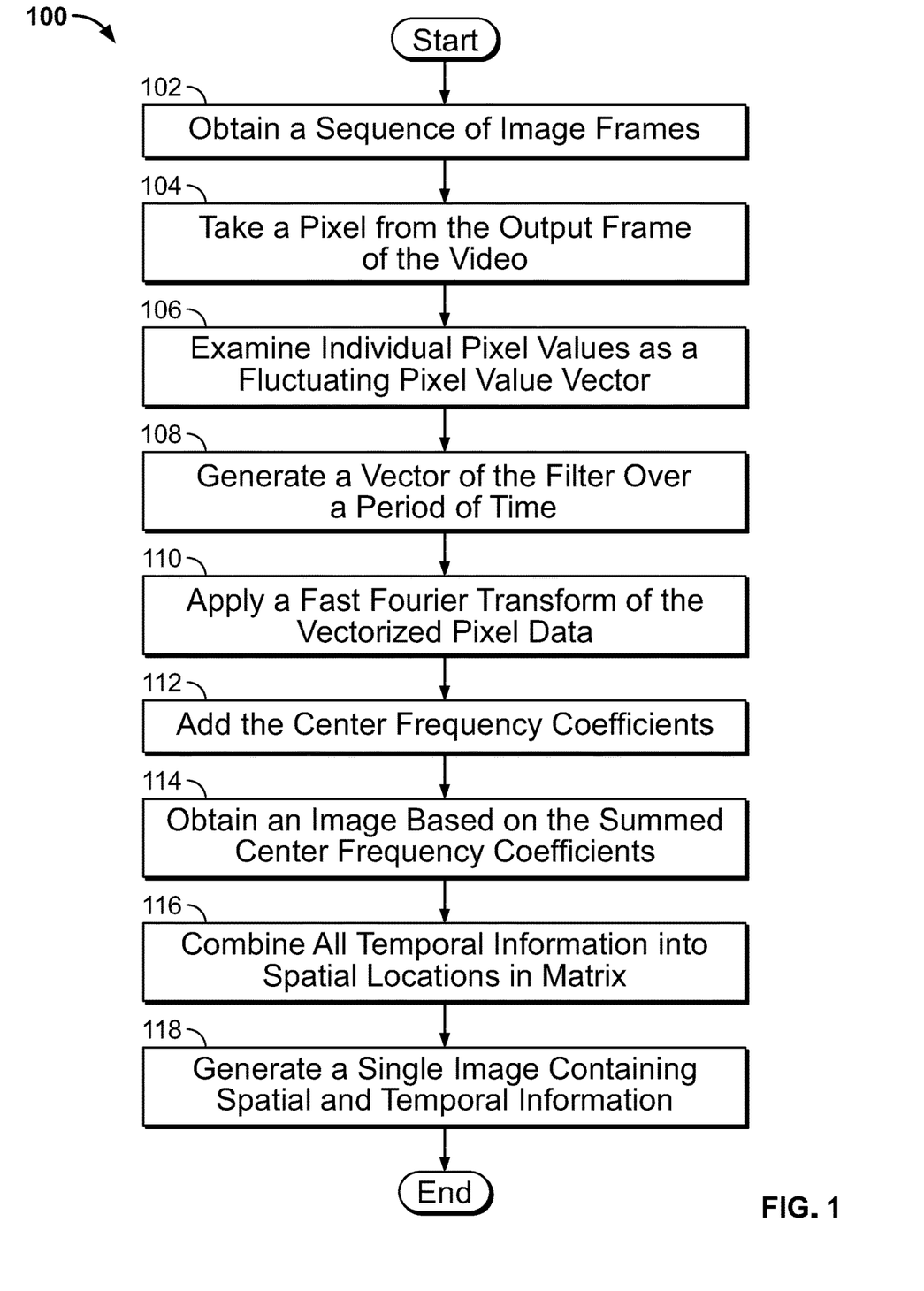
FIG. 1 is a flow diagram of an exemplary embodiment of the temporal frequency analysis method.

Referring to FIG. 1, a flow diagram of the temporal frequency analysis method 100 is shown. First, at step 102, a sequence of image frames is obtained. A pixel is taken from the output frame of the video at step 104. Next, the system proceeds to step 106, and individual pixel values are examined as a fluctuating pixel value vector. A vector is generated by examining this filter over a period of time at step 108. Then at step 110, the method applies a fast Fourier transform of the vectorized pixel data. The center frequency coefficients are then added together at step 112, and proceeds to step 114 to obtain the frequency information present in the pixel fluctuations. At step 116, the summed center frequency coefficients are returned to the two-dimensional space, and at step 118, an image is generated based on the combined special and temporal information.

Figure 3:
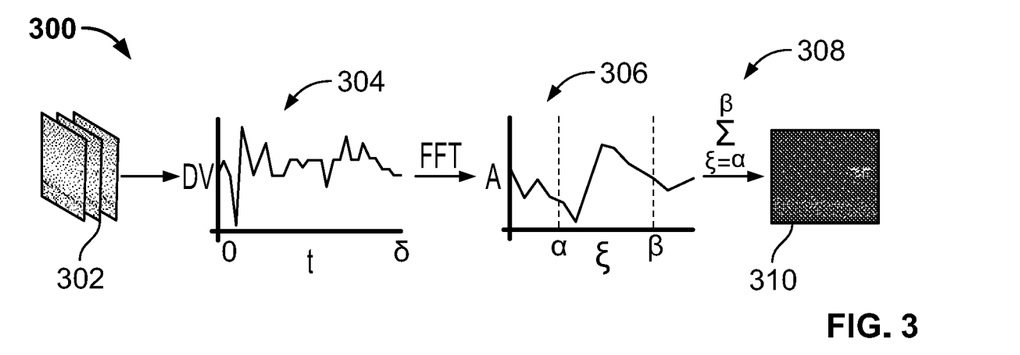
FIG. 3 shows a graphical representation of the method of claim 1.

Referring to FIG. 3, a visual representation 300 of the steps described in FIG. 1 is shown. The steps implement the temporal frequency analysis method. First a stack, or sequence, of frames 302 is obtained. The individual pixel values are examined as a fluctuating pixel value vector 304. The fast Fourier transform 306 of the vector is taken and the center frequency coefficients summed 308. Finally, the sums are returned to the two-dimensional space to obtain an image 310.

In one alternate embodiment, the coefficients may be generated using the fast Fourier transform on the pixel vector. The coefficients may be grouped and the summation of the coefficients examined for each grouping. In this embodiment, a random selection of coefficients is summed. For example, in an embodiment, the lower quarter of the coefficients, upper quarter of the coefficients, and remaining center coefficients may be summed. The resulting singular value is positioned in the same spatial location in the resulting matrix.

Figure 2:
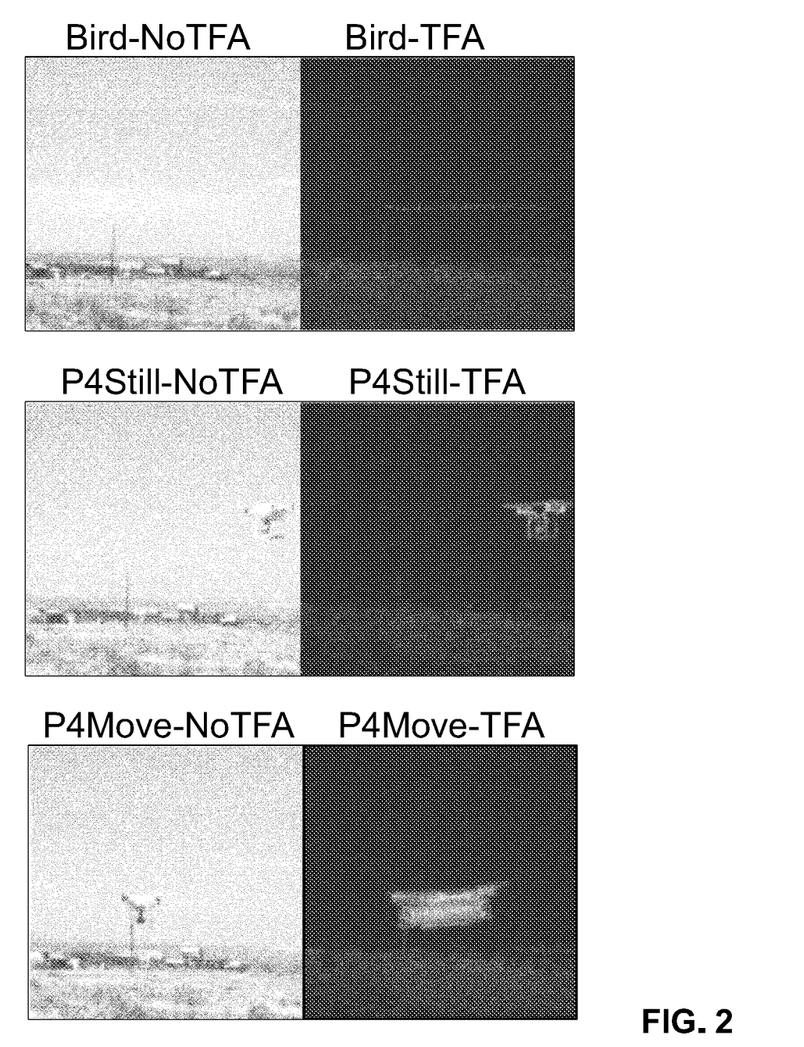
FIG. 2 shows examples of original images and the corresponding images after temporal frequency analysis is applied.

The temporal frequency analysis results in a series of still frames equal to the summation of the frequency coefficients for pixel variations. The combination of all the temporal information into spatial locations in the resulting matrix provides a single image containing both the spatial and temporal information present in the initial frame stack. Examples of original images and the temporal frequency analyzed images are shown in FIG. 2. Utilizing the center coefficients to recreate the image provides many inherent advantages. First, the use of the center coefficients inherently removes the background, which is essentially static and a low frequency component. Second, much of the noise from the image is removed by not utilizing the high frequency coefficients. Finally, the desired targets have the highest frequency variation in the midrange. Utilizing the mid-range coefficients inherently weights the desired targets above the nuisance targets.

Machine learning aspects of the disclosed methods may include a variety of algorithms and methods. The method includes supervised learning. Supervised learning applies previously categorized inputs, or predictors, to predict the outputs based on pattern recognition or features. In one embodiment, the supervised learning may be implemented using a convolutional neural network (CNN). A CNN is a deep learning algorithm suitable for image recognition. CNNs may require a large amount of data in order to train. In another embodiment, e.g., wherein data obtained from testing may be insufficient to train a full CNN, transfer learning may be employed. A previously trained CNN, GoogLeNet Inception, may be used. The GoogLeNet CNN includes features for a variety of spatial images encoded previously, and the data obtained from testing may be used to tune the surface level neurons to the desired targets. Use of CNN is a non-limiting example and it should be appreciated that other deep learning techniques may be used in other embodiments.

In an exemplary embodiment, the frames obtained during data collection may be evaluated using the temporal frequency analysis method. First, a frame is obtained, and the thirty frames previous to the last obtained frame are utilized to generate pixel fluctuation vectors for each pixel within the image. The fast Fourier transform is then applied to each pixel and the frame replaced with the sum of the center frequency coefficients. The steps are repeated while progressing through the entirety of the frames collected. Next, the data may be examined to ensure cleanliness. As the frames are replaced with the activity of the previous thirty frames, some frames are capable of having two simultaneous targets, which limits the success of the machine learning algorithms. The data may be cleaned to account for these, and other, inconsistencies within the training data. In an embodiment, data may be cleaned manually, e.g., by examining the frames to ensure that the "tag" and the "target" are the same. This prevents uncleaned or spurious data from influencing the classification (e.g., if a bird is incorrectly tagged as a drone in the training step). The data is then trimmed in order for each target to have nearly the same number of images. This trimming process assists in restricting bias in the system decisions. A machine learning algorithm is then trained on the frames. In one exemplary embodiment, the machine learning algorithm may be GoogLeNet Inception.

In an embodiment, evaluation of the temporal frequency content of the images may be performed by using Fourier mathematical algorithms to process the digital signal. Relevant sections of data obtained from UAS flights are isolated and images containing the target, whether UAS or bird, are partitioned. The same image without the target is also partitioned to obtain an average background image for noise management. The average background image is subtracted from the background and target containing frames to obtain the changes for each frame. The mathematical algorithms for determining the temporal frequency content are set forth below in equations 1 through 3.

$$\overline{B} = \sum_{i=t}^{n} \frac{B(i)}{n} \quad [\text{Eq. 1}]$$

$$\Delta \overline{B}(t) = \sum_{n,m=1}^{k} \frac{B(n, m, t) - \overline{B}}{k} \quad [\text{Eq. 2}]$$

$$\Delta \overline{T}(t) = \sum_{n,m=1}^{k} \frac{T(n, m, t) - \overline{B}}{k} \quad [\text{Eq. 3}]$$

In equations 1 through 3, B' is the average background image, ΔB' is the average of the changes in each background frame, ΔT' is the averages of the changes in each object data frame, B is the background frame data, and T is the target frame data.

Next, the averages of each frame are taken to obtain an image average over time. This average is expected to change according to the frequency of the object, e.g., a Phantom 4 drone propeller, as the object comes in and out of view of the camera. Using the gradient of these averages, the changes are isolated from the digital value offset for analysis. The analysis is performed by taking the fast Fourier transform of both the background gradients and the object data gradients. As the result of this transformation is complex, the magnitude of the transformation is taken, and a frequency shift is applied to obtain the frequency spectrum of two Phantom 4 tests and one bird test. The mathematics for this can be seen in equations 4 and 5 below.

$$\mathscr{F} = |\mathscr{F}(\nabla \Delta \overline{T})| \quad [\text{Eq. 4}]$$

$$\mathscr{B} = |\mathscr{F}(\nabla \Delta \overline{B})| \quad [\text{Eq. 5}]$$

In Equations 4 and 5, $\mathscr{F}$ is the frequency spectrum of the gradient of the averages of the target data and β is the frequency spectrum of the gradient of the averages of the background data.

Figure 4:
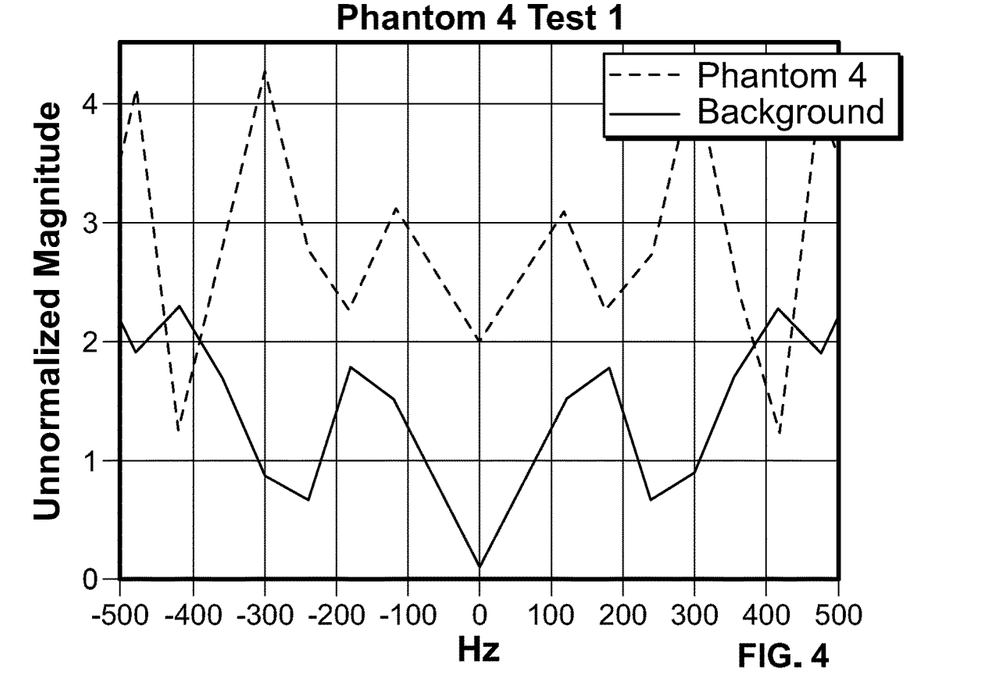
FIG. 4 shows a frequency spectrum associated with a Phantom 4 drone UAS in a flight against a test background.
Figure 5:
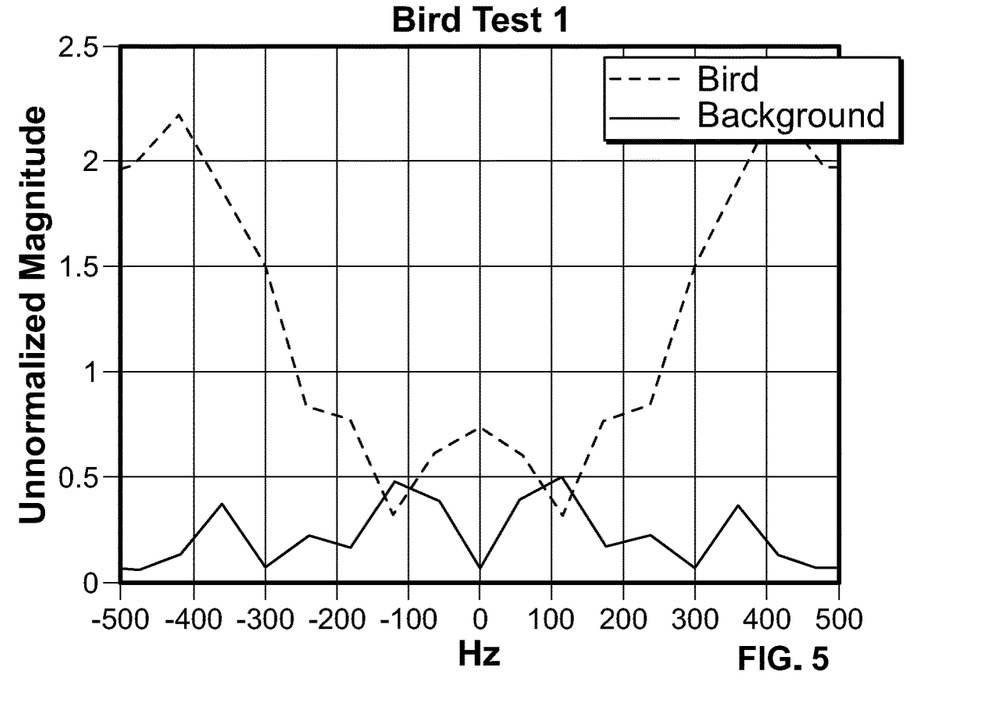
FIG. 5 shows a frequency spectrum associated with a bird flying against the same background image as that in FIG. 3.

The resulting frequency spectrums are shown in FIGS. 4 and 5. FIG. 4 shows the background data as dashed lines and the object data as solid lines. The contrasting profiles demonstrate a specific frequency behavior that is present for the data obtained from the UAS object, which in the example of FIG. 4 corresponds to a Phantom 4 drone. Such profile data is not present in FIG. 5 showing the data associated with a bird, or in the background data associated with no target present in the field of view. This example demonstrates the use of frequency spectrum in the detection and assessment of UAS.

The disclosed method requires minimal image processing and may be implemented to operate in real-time for a passive imaging system. In one embodiment, the method includes subdividing captured image into macro-pixels, collecting temporal data vectors for each macro-pixel, performing gradient operations, and performing fast Fourier transform operation, e.g., using traditional security cameras, this method may divide an image into 32×32 macro-pixel regions and apply temporal aliasing algorithms operating continuously on every region. Traditional imagers refer to the light spectrum ranges. Traditional security cameras provide images within the visible spectrum range. In alternate embodiments, the system may be configured to operate in the thermal wavelength spectrum or other spectrums. If very large imaging systems are used, or multi-fields of view imaging devices stitched together, continual operation on every 32×32 macro-pixel may be too computationally extensive. To mitigate this, a rudimentary change detection algorithm may be performed initially to identify moving targets within the field of view, then the temporal aliasing method is applied to every moving target to enable detection and assessment of a UAS.

Figure 6:
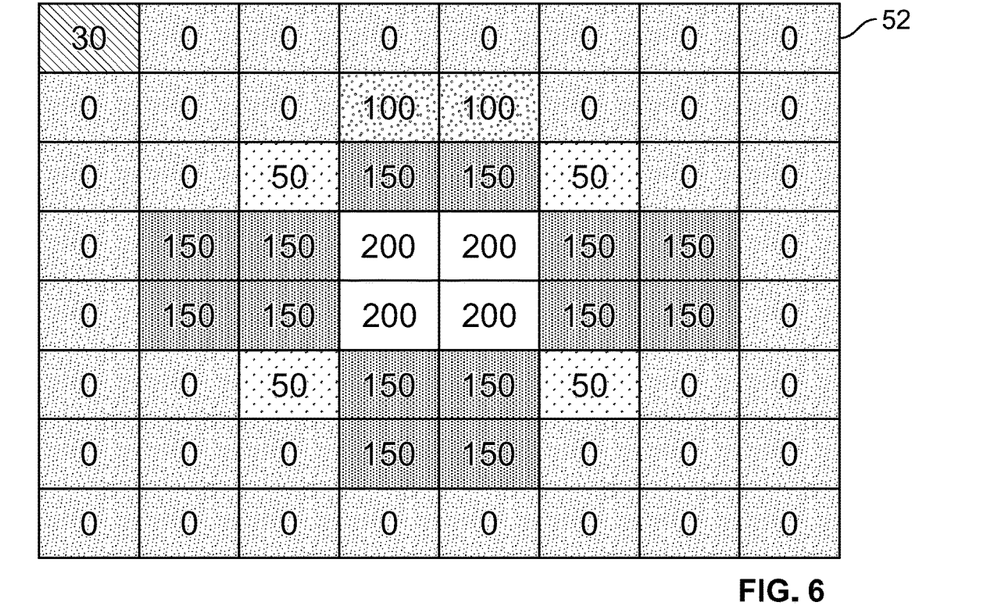
FIG. 6 shows a sample video image frame with spatial information.
Figure 7:
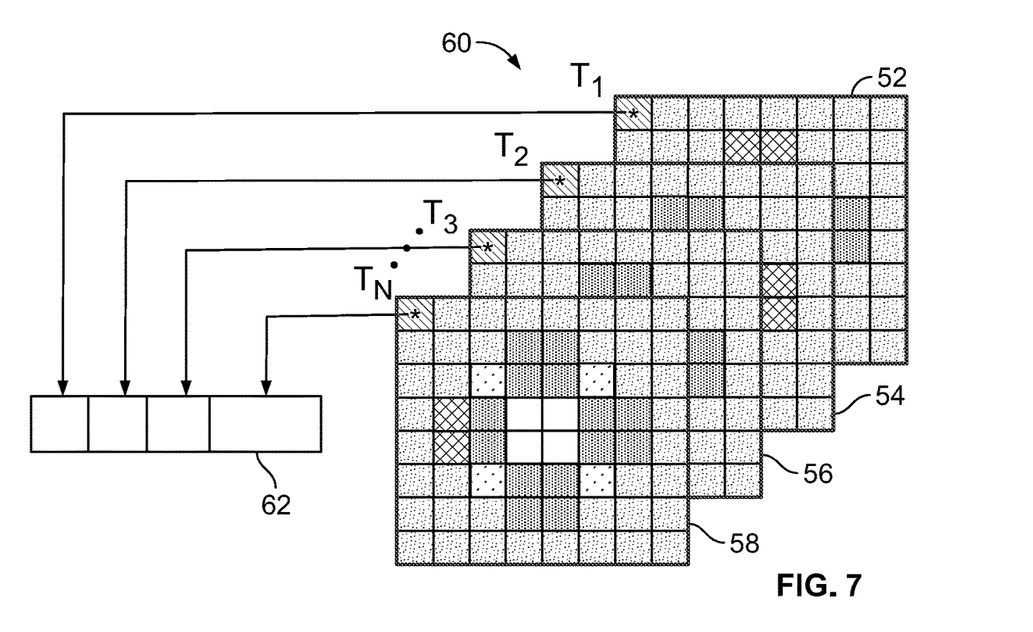
FIG. 7 shows a timed sequence of video images.
Figure 8:
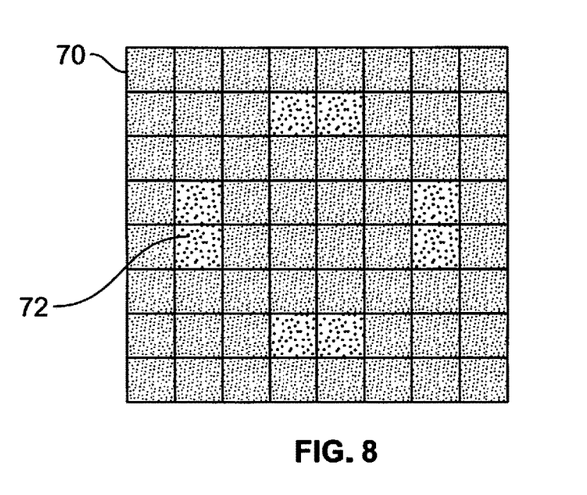
FIG. 8 shows a transformation frame showing the temporal differences in special information.

Referring next to FIG. 6, a sample video image frame 52 including spatial information is shown. This initial frame 52 is a starting point for temporal frequency analysis. A timed sequence 60 of video images corresponding to sequential times $T_1, T_2, T_3 \ldots T_n$ (52, 54, 56, 58) is shown in FIG. 7. Pixels 62 are isolated and the changes over time are merged to create a transformation frame 70 (FIG. 8) showing the temporal differences 72, which disclose frequency characteristics of UAS when present in the digital image sequence.

Figure 9:
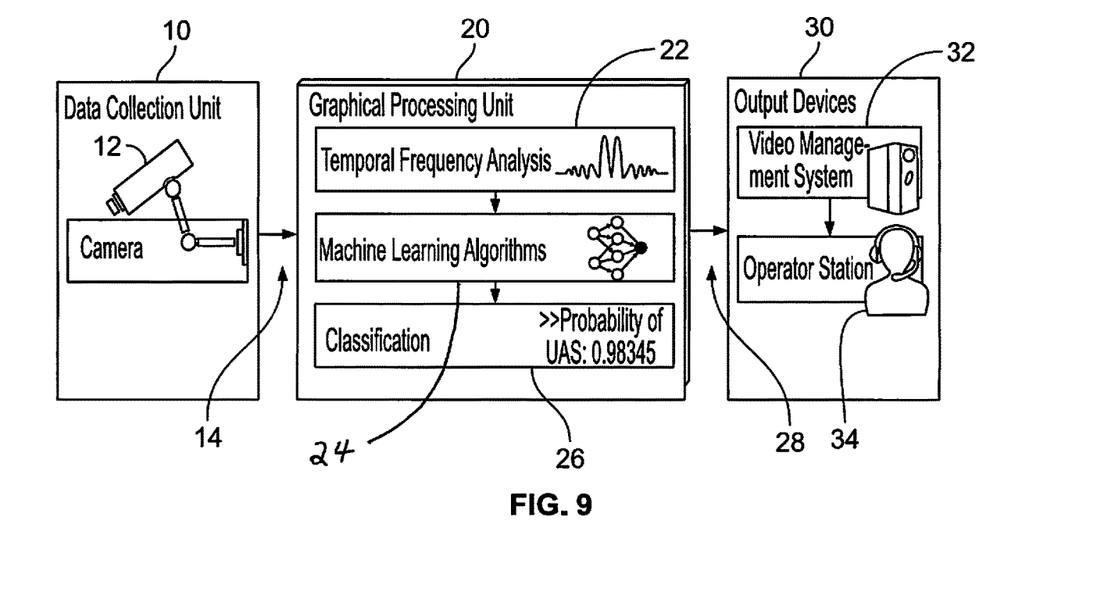
FIG. 9 shows an exemplary embodiment wherein a system hardware configuration is shown for implementing the temporal frequency analysis method.

Referring next to FIG. 9, in one exemplary embodiment, a system hardware configuration is shown for implementing the method of the disclosure. A data collection unit 10, a graphical processing unit 20 and an output device 30 are interconnected in data communication. Data collection unit 10 includes a video camera or other video acquisition device 12. Camera 12 acquires a sequence of video data, e.g., digital images, of the area of interest. The collected data is transmitted to graphical processing unit (GPU) 20 via communication link 14. GPU 20 includes a temporal frequency analysis module 22, a machine learning module 24, and a classification module 26. GPU 20 receives the digital images and processes the images in the received sequence. Temporal frequency analysis is performed by module 22. The machine learning module 24 applies at least one machine learning algorithm, e.g., CNN, to the data output of module 22. Machine learning spans a large field with a variety of algorithms and techniques. The majority of the methods may be summarized under the concepts of supervised learning, wherein previously categorized inputs, or predictors, are used to predict the outputs based on pattern recognition, or features. In the exemplary embodiment, the supervised learning is implemented using a convolutional neural network, or CNN.

Classification module 26 performs a classification based on frequency module 22, e.g., the GoogLeNet CNN on the raw data and the temporal frequency analyzed data. The GPU 20 transmits its processed image data via a communication link 28 to output devices 30. Output devices 30 include a video data management system 32 in data communication with an operator station 34 for viewing and analysis by a human operator. Classification accuracies may be determined by a human examining each individual frame and noting all the training classes present in that frame. A training process provides greater accuracy based on feedback analysis by the operator. This methodology precludes the standard confusion matrix method of examining the success of the machine learning algorithm. Instead, the confusion matrix may be generated with the test instances containing multiple target types excluded. Classification errors and successful classification may be examined to evaluate the strengths and weaknesses of the temporal frequency analysis (TFA). When UAS at far distances performs a UAS specific motion, e.g., an upward curve trajectory, the system classifies the object as a UAS target without a nuisance alarm as was the case in prior art raw data detection and classification systems. The raw data method may be capable of classifying UAS targets that are near the camera, but is unable to successfully classify UAS targets at a distance from the camera.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or resequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the method and system for UAS detection and assessment via temporal intensity aliasing as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming methods with rule based logic and other logic to accomplish the various connection steps, processing steps, comparison steps and decision steps.

The invention claimed is:

1. A method for temporal frequency analysis for identification of unmanned aircraft systems comprising:
    obtaining a sequence of video image frames and providing a pixel value from an output frame of the video;
    generating a fluctuating pixel value vector;
    examining the fluctuating pixel value vector over a period of time;
    summing a plurality of frequency coefficients associated with the corresponding vectorized pixel values from the fluctuating pixel value vector to obtain summed center frequency coefficients;
    obtaining frequency information present in the pixel fluctuations;
    obtaining an image representing a two-dimensional space based on the summed center frequency coefficients;
    generating a series of still frames equal to a summation of the center frequency coefficients for pixel variations; and
    combining the summation of the center frequency coefficients for pixel variations into spatial locations in a matrix to provide a single image containing the spatial and temporal information present in the sequence of video image frame.

2. The method of claim 1, further comprising applying a fast Fourier transform of the vectorized pixel values to generate a center frequency for the pixel value.

3. The method of claim 2, further comprising grouping the center frequency coefficients.

4. The method of claim 3, further comprising examining the summation of the coefficients examined for each grouping.

5. The method of claim 4, further comprising summing a lower quarter of the coefficients.

6. The method of claim 5, further comprising summing an upper quarter of the coefficients.

7. The method of claim 6, further comprising summing center coefficients.

8. The method of claim 7, further comprising positioning a resulting singular value of the lower quarter, upper quarter and center coefficients in the same spatial location in a resulting matrix.

9. A method for temporal frequency analysis for identification of an unmanned aircraft system (UAS) comprising:
    generating a sequence of images;
    evaluating a temporal frequency content of the sequence of images;
    processing a digital signal generated from the evaluation of the temporal frequency content by applying a Fourier transform algorithm;
    isolating at least a portion of a data set representing UAS flights;
    partitioning images containing a target;
    partitioning the images containing a target to create same images without the target;
    obtaining an average background image for noise management; and
    subtracting the average background image from the images containing a target to obtain changes for each frame.

10. The method of claim 9, wherein the Fourier transform algorithm comprises:

$$B = \sum_{i=t}^{n} \frac{B(i)}{n}$$

$$\Delta B(t) = \sum_{n,m=1}^{k} \frac{B(n, m, t) - B}{k}$$

$$\Delta \bar{T}(t) = \sum_{n,m=1}^{k} \frac{T(n, m, t) - \bar{B}}{k}$$

wherein B' is the average background image, ΔB' is the average of the changes in each background frame, ΔT' is the averages of the changes in each object data frame, B is the background frame data, and T is the target frame data.

11. The method of claim 10, further comprising:
    taking an average value of each frame to obtain an image average over time;
    isolating a change from a digital value offset using a gradient of the image average;
    performing the fast Fourier transform algorithm for a background data gradient associated with each image;
    performing the fast Fourier transform algorithm for an object data gradient associated with each image;
    determining a magnitude of the transformation; and
    applying a frequency shift to determine a frequency spectrum of a sequence of images.

12. The method of claim 11, wherein a gradient $\mathcal{F}$ of the object data gradient frequency spectrum and a gradient β of the background data gradient is calculated based on an algorithm:

$$\mathcal{F} = |\mathcal{F}(\nabla \Delta \bar{T})|$$

$$\mathcal{B} = |\mathcal{F}(\nabla \Delta \bar{B})|$$

wherein $\mathcal{F}$ is the frequency spectrum of the gradient of the averages of the object data and β is the frequency spectrum of the gradient of the averages of the background data.

13. The method of claim 12, further comprising contrasting a graphical profile generated by the frequency spectrum of the gradient of the averages of the object data with a graphical profile of the frequency spectrum of the gradient of the averages of the background data to demonstrate a specific frequency behavior for the object data.

14. The method of claim 13, further comprising wherein the object data is associated with a UAS object.

* * * * *